(12) United States Patent
Brunner

(10) Patent No.: US 8,151,435 B2
(45) Date of Patent: Apr. 10, 2012

(54) METHOD FOR FORGING A SPINDLE HOUSING

(75) Inventor: Ronald E. Brunner, Sundance, WY (US)

(73) Assignee: Brunner Manufacturing Co., Inc., Mauston, WI (US)

( * ) Notice: Subject to any disclaimer, the term of this patent is extended or adjusted under 35 U.S.C. 154(b) by 444 days.

(21) Appl. No.: 12/357,778

(22) Filed: Jan. 22, 2009

(65) Prior Publication Data

US 2009/0208303 A1    Aug. 20, 2009

Related U.S. Application Data

(60) Provisional application No. 61/064,074, filed on Feb. 14, 2008.

(51) Int. Cl.
*B23P 13/04* (2006.01)
(52) U.S. Cl. ........................................... 29/557; 56/255
(58) Field of Classification Search .................. 409/231; 29/557, 894.362; 280/124; 56/17.5, 255, 56/295
See application file for complete search history.

(56) References Cited

U.S. PATENT DOCUMENTS

| | | | | |
|---|---|---|---|---|
| 3,890,773 | A * | 6/1975 | Frost | 56/255 |
| 5,603,882 | A | 2/1997 | Takano et al. | |
| 6,286,293 | B1 * | 9/2001 | Scag et al. | 56/17.5 |
| 6,916,030 | B2 | 7/2005 | Cai | |
| 2002/0029868 | A1 * | 3/2002 | Katsui | 165/80.3 |
| 2002/0088609 | A1 * | 7/2002 | Tantoush | 165/104.33 |
| 2003/0196468 | A1 * | 10/2003 | Ando et al. | 72/353.2 |

* cited by examiner

*Primary Examiner* — David Bryant
*Assistant Examiner* — Moshe Wilensky
(74) *Attorney, Agent, or Firm* — Price Heneveld LLP

(57) ABSTRACT

A manufacturing method includes shearing or cutting an elongated rod blank from bar stock, forge-forming a through hole in the rod blank that extends longitudinally through opposing ends of the rod blank, forge-forming a radially-extending collar on the rod blank between the opposing ends, forming attachment holes in the radially-extending collar, and extruding bearing bores in each of the recesses to form a main spindle housing. Bearings are supported in forged recesses at each end, and a shaft is rotatably supported on the bearings. The spindle housing includes a rod portion and collar both forged from the rod blank for work-hardened strength of material, and includes attachment holes and the through hole formed by pressing out slugs of material, thus facilitating recycling of scrap.

14 Claims, 4 Drawing Sheets

METHOD FOR FORGING A SPINDLE HOUSING

CROSS REFERENCE TO RELATED APPLICATION

This is a utility application claiming benefit under 35 U.S.C. §119(e) of provisional application Ser. No. 61/064,074, filed Feb. 14, 2008, entitled: SPINDLE HOUSING.

BACKGROUND

The present invention relates generally to spindle housings. More particularly, this invention relates generally to forged aluminum spindle housings that can be used in transmitting power to a lawn mower blade or other device. However, the present invention is not believed to be limited to only aluminum spindle housings, nor to lawn mower apparatus.

Spindles and spindle housings have been used in various applications to convey rotary motion. In the lawn mower art, these parts have been used to transmit power from an engine to a lawn mower blade. Historically, spindle housings are formed using a "die cast" process followed by secondary machining to make the finished parts. The die cast manufacturing processes used to manufacture spindle housings can be problematic, however, because the secondary machining can open up porosity in the casting which results in weak areas, warranty issues, and potentially safety issues. Also, secondary machining results in a volume of metal chips and machined debris, which can be challenging to deal with and difficult to recycle.

SUMMARY OF THE PRESENT INVENTION

In one aspect of the present invention, a method includes steps of separating an elongated rod blank from bar stock, forming a through hole in the rod blank that extends longitudinally through opposing ends of the rod blank including forging the rod blank to form at least a portion of the through hole, and forge-forming the rod blank to form a radially-extending collar on the rod blank between the opposing ends. The method also includes steps of piercing attachment holes in the radially-extending collar, and extruding bearing bores in each of the recesses to form a spindle housing.

In another aspect of the present invention, a spindle housing includes a component made from a rod block of aluminum having first, second and third sections. The component includes an elongated rod portion forge-formed from the first, second and third sections to have opposing ends with longitudinally-extending work-hardened material forming bearing recesses in the opposing ends, the bearing recesses being adapted to support bearings at each of the ends in alignment with a through hole in the rod portion. The component further includes a collar portion forge-formed from one of the sections to have laterally-extending work-hardened material, the collar extending radially from the rod portion and including attachment holes positioned and adapted for attachment to a support structure.

An object of the present concept is to provide a forged housing design that improves upon the art, such as by eliminating or substantially reducing the need for secondary machining. Further, the disclosed design may eliminate or at least substantially reduce the production of waste chips during the secondary manufacturing/machining process. In particular, the disclosed design preferably generates pierced slugs which can be easily recycled in comparison to waste chips from secondary machining of die cast parts. In one form, the disclosed design generates only pierced slugs and the manufactured part.

Another object is to provide a forging process that uses adaptable tooling in the manufacturing process. As would be readily understood by those of skill in the art after reading this disclosure, many changes can be made to the forging tooling at minimal cost to make different/various versions of the housing. By contrast, changes to die cast tooling often require a significant amount of labor and cost. Similarly, the initial cost of die cast tooling (and changes to the tooling) can be much higher (such as up to six times the cost) as compared to the disclosed forging tooling.

Another object is to utilize work-hardened strength properties of forge-formed spindle housings to reduce or eliminate problems associated with part failures in known die cast parts. For example, typical die cast parts may, in certain failures, be prone to breaking apart. Pieces that do come apart may get projected outward toward edges of the deck which can be a safety hazard. By providing a forged aluminum housing, the material tends to deform rather than break apart, which is potentially a safer condition.

These and other aspects, objects, and features of the present invention will be understood and appreciated by those skilled in the art upon studying the following specification, claims, and appended drawings.

BRIEF DESCRIPTION OF DRAWINGS

FIGS. 6-7 show sufficient forging tooling for the forge-forming process for a person of ordinary skill on this art to understand.

DESCRIPTION OF EMBODIMENTS

Figure 1:
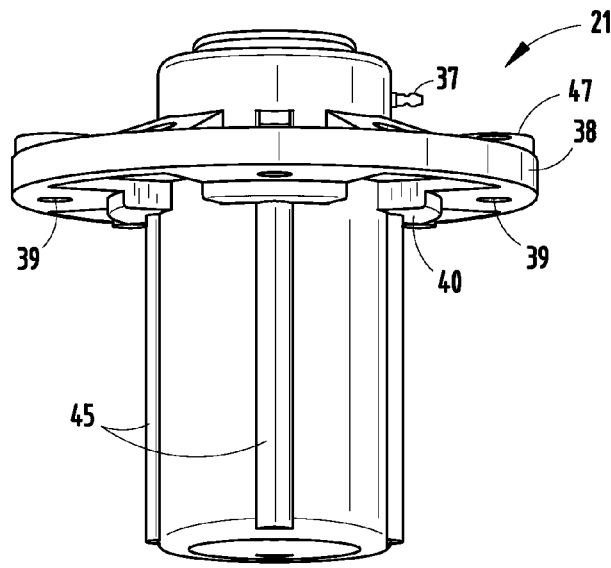
FIG. 1 is a perspective view of a spindle housing.
Figure 2:
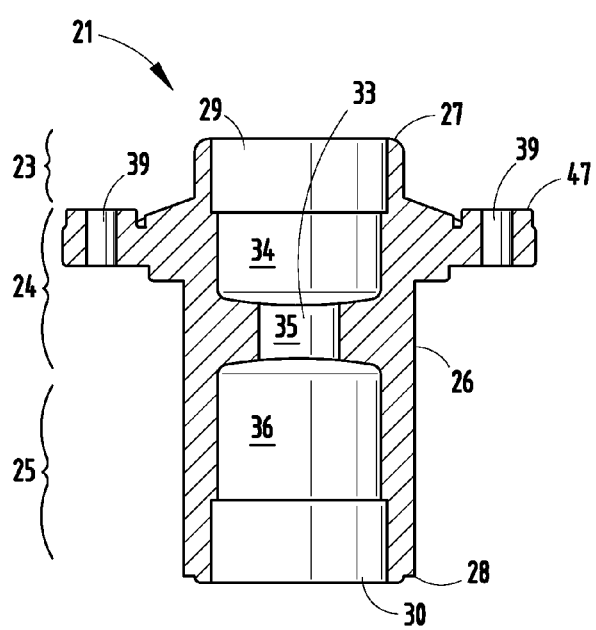
FIG. 2 is a cross-sectional view of FIG. 1.
Figure 1A:
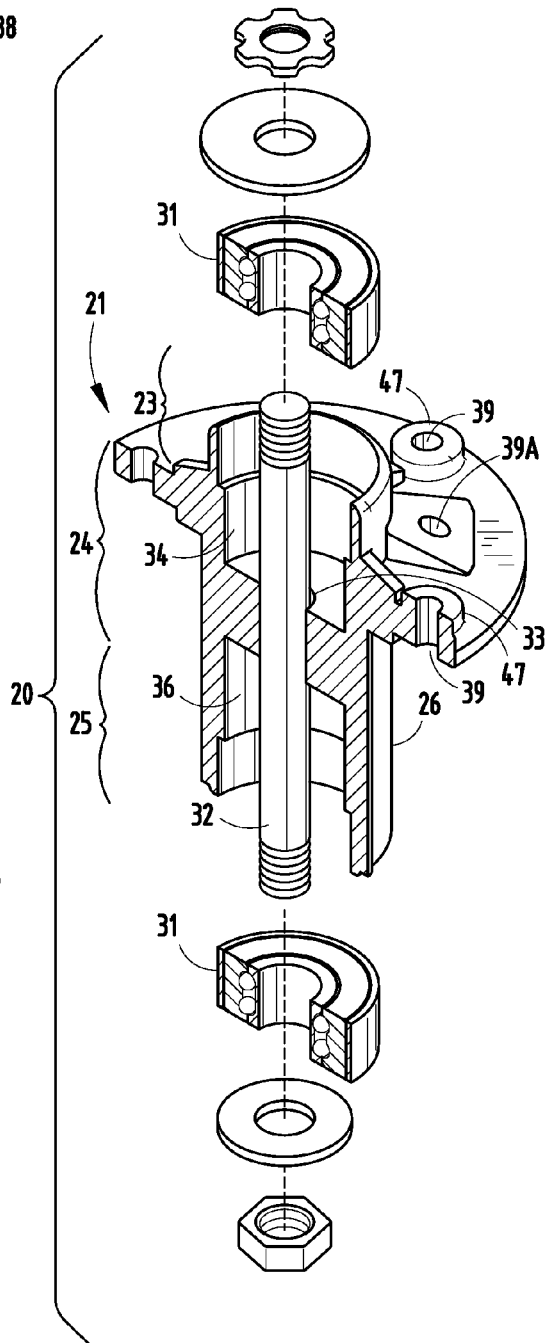
FIG. 1A is an exploded view of a spindle assembly including the housing of FIG. 1 partially in section to show internal structure.
Figure 3:
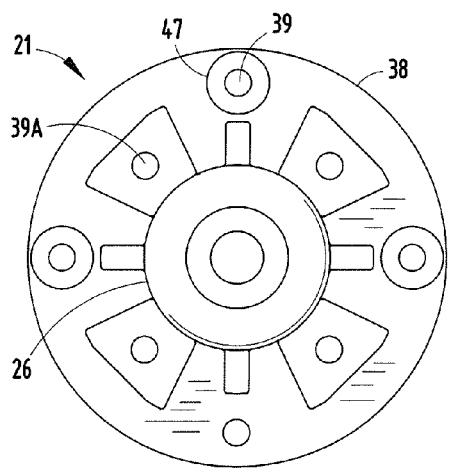
FIGS. 3-4 are opposing end views of the spindle housing of FIG. 1.
Figure 4:
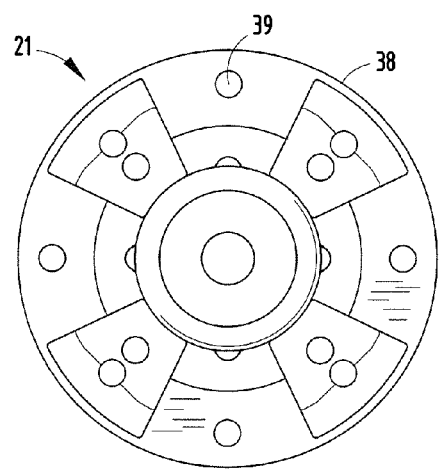
Figure 5:
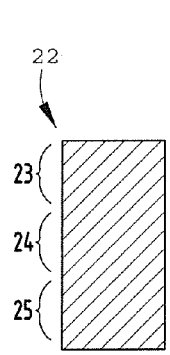
FIGS. 5-9 are side cross-sectional views of a rod blank during sequential forge-forming of the rod blank into the spindle housing of FIG. 1.
Figure 6:
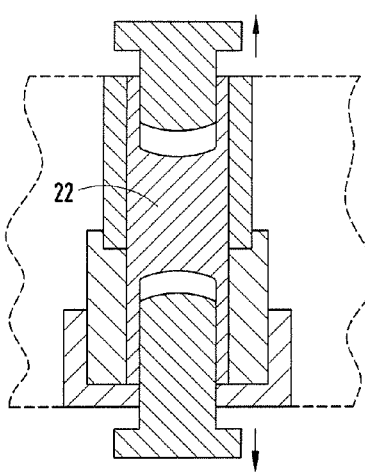
Figure 7:
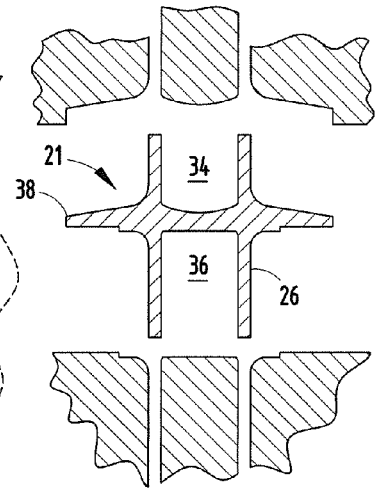
Figure 8:
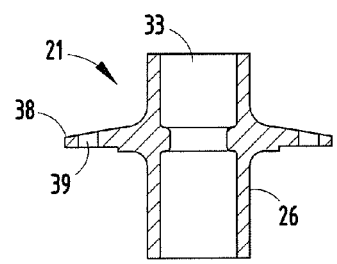

A spindle housing assembly 20 (FIG. 1) includes a spindle housing 21 (also called a "component") made from a rod block 22 (FIG. 5) of aluminum having first, second and third sections 23, 24, and 25. The spindle housing 21 (FIG. 1 and see FIGS. 6-9) includes an elongated rod portion 26 (also called "rod") that is cold-forge-formed from the first, second and third sections 23-25 to have opposing ends 27, 28 with longitudinally-extending work-hardened material forming bearing recesses 29, 30 in the opposing ends 27, 28. The bearing recesses 29, 30 are adapted to support bearings 31 at each of the ends 27, 28 in alignment with a through hole 33 (formed by hole portions 34-36) in the rod portion 26. The bearings 31 in turn support a rotary drive spindle shaft 32 that extends through the housing assembly 20. One or more zerks 37 can be placed on upper and/or lower rod sections for providing grease to the bearings 31.

The spindle housing 21 further includes a collar portion 38 (also called "collar") that is cold-forge-formed from one of the sections (i.e., from section 24 in the spindle housing 21 of FIG. 1) to have laterally-extending work-hardened material. The collar 38 extends radially from the rod portion 26 and includes attachment holes 39 and 39A and depressions 40 spaced radially around the rod portion 26 and positioned/adapted for attachment to a support structure, such as a deck of a lawn mower. The illustrated holes 39 are positioned at a first radial dimension, and the holes 39A are positioned at a second radial dimension, with some of the holes being in depressions 40 and others being outside the depressions 40 in thicker areas of the collar 38.

Figure 14:
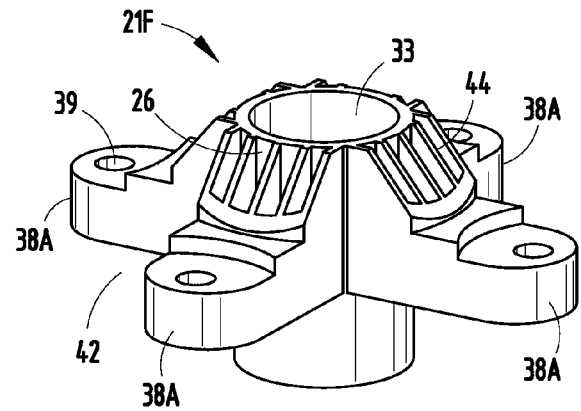
Figure 15:
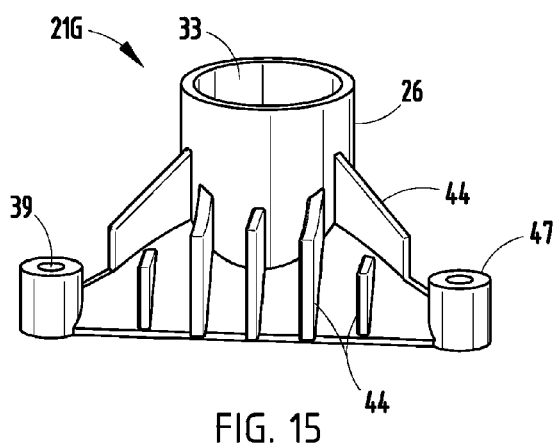
Figure 16:
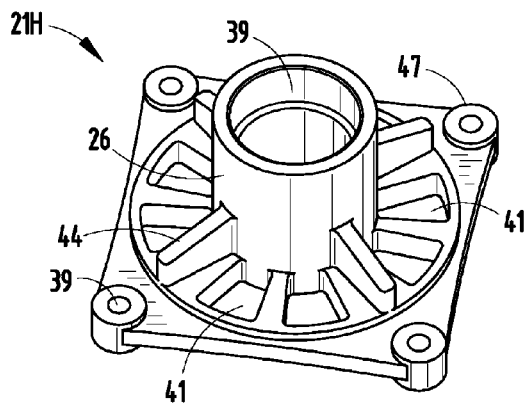
Figure 17:
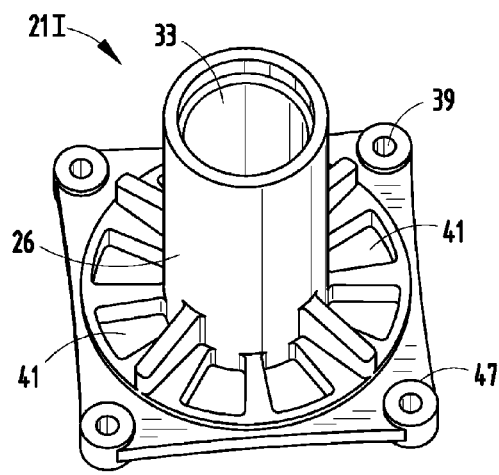
Figure 18:
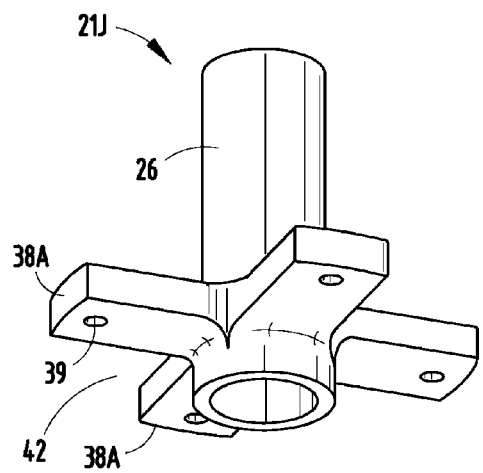

It is contemplated that the structure of the spindle housing 21 can be modified depending on particular functional requirements of a design. For example, the attachment holes 39 and/or 39A can be threaded or unthreaded, depending on functional requirements of a particular design. Further, the depressions 40 can be formed in the collar 38 at specific depths for balance and weight control. Alternatively, slugs of material can be punched from the collar 38 to form windows (see windows 41 in FIGS. 16-17) or notches (see notches 42 in FIG. 14 and 18). Depending on a shape and location of the notches 42, the collar 38 is formed by multiple arms 38A spaced circumferentially around the rod portion 26 at regular spacings (FIG. 18). Notably, ribs (not shown in FIG. 1) can also be formed in the collar 38 for strengthening and stabilizing the collar 38 on the rod portion 26 (see ribs 44 in FIGS. 10-11, 13-17).

It is contemplated that the rod portion 26 can also be modified. For example, ribs 45 can be formed longitudinally along the rod portion 26 for strengthening the rod portion 26 (FIG. 1, and see FIGS. 10-11, 13-15). The ribs may be similar in shape or have many different shapes, approach angles, and thicknesses (compare ribs 44 in FIGS. 10-11, 13-15). The collar 38 can include enlarged bosses 47 (see FIGS. 1, 2, 10, 11, 15-17) formed around the location of attachment holes 39/39A for increased strength and stability of the system when attached.

Figure 10:
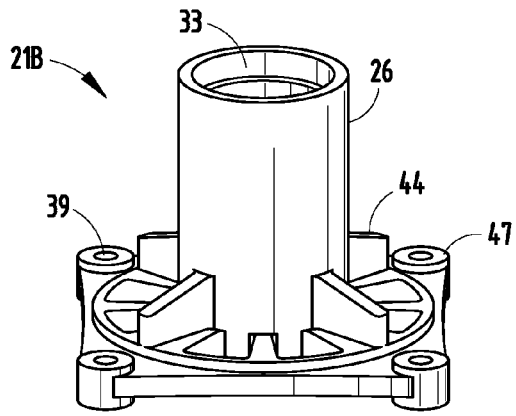
FIGS. 10-18 are perspective views of additional modified spindle housings.
Figure 11:
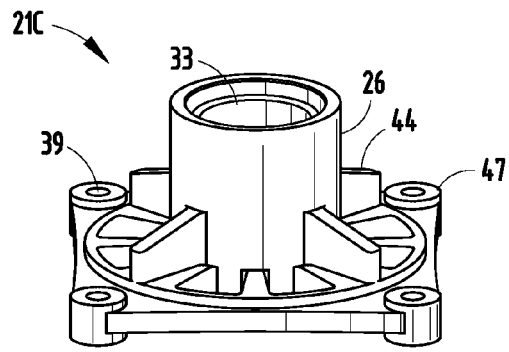
Figure 12:
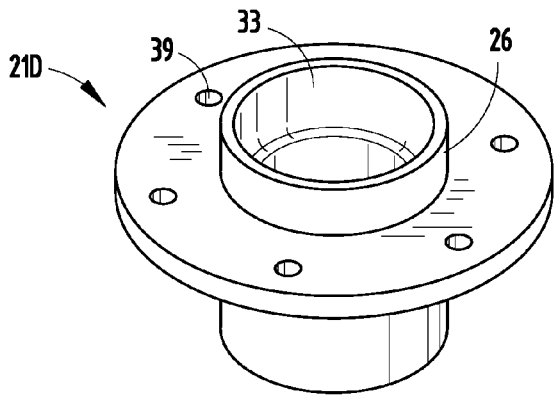
Figure 13:
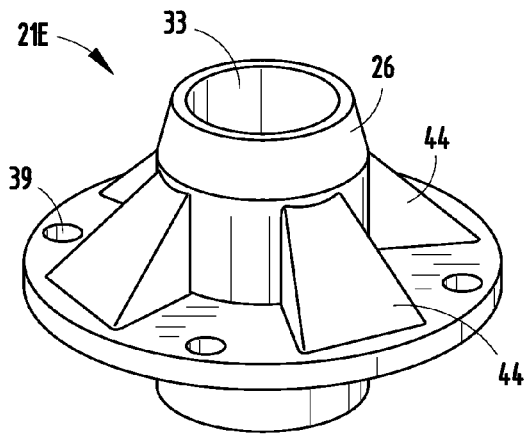

Tooling for cold-forge-forming is more flexible than die cast tooling, since it can better accept inserts and/or attachments and/or spacers, as will be understood by persons skilled in this art. For example, notice in FIGS. 10-11 where the upper and lower tooling dies for forming the spindle housings of FIGS. 10-11 are virtually the same except for a length of the rod portion. (Comparative lengths of the rod portions in FIGS. 10-11 are different, but all surfaces near the collar are the same.) This can be done by starting with the upper tooling die for making the short spindle of FIG. 10, and attaching an insert or attachment or modification to the upper tooling die that allows an upper part of the rod portion to extend a longer distance while still being accurately forged (i.e., for the spindle housing of FIG. 11).

Figure 9:
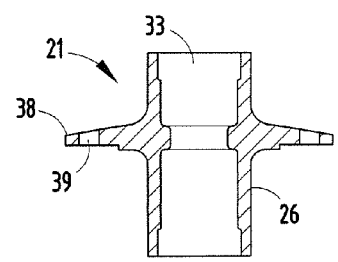

A method of the present invention (illustrated in FIGS. 5-9) includes steps of separating (such as by shearing off or cutting off) an elongated rod blank from bar stock (FIG. 5), and cold-forge-forming portions (34, 36) of a through hole in the rod blank that extend longitudinally into opposing ends of the rod blank. In the present illustrated method, the through hole 33 is later formed fully through the rod portion by longitudinally pressing out a slug of material in section 24 to form the hole portion 35 . . . which completes hole 33 (i.e., the combination of hole portions 34-36). The method includes cold-forge-forming collar 38 (FIG. 7) by pressing the end portions 23 and 25 toward each other. The method includes pressing out (or piercing out) slugs of material to form the attachment holes 39, 39A (FIG. 8), ribs, notches/arms, depressions, and other features on the rod or collar. The bearing recesses are forge-formed into ends of the rod portion (FIG. 9). The entire illustrated spindle housing 21 can be made without any machining . . . or the forged part can be machined as needed.

The spindle housings 21B-21J (FIGS. 10-18, respectively) show alterative spindle housing designs, where the components and features are varied in shape, size, location, number, and mass of material in order to meet various functional requirements. In all embodiments, the material moved during the cold-forge-forming processes is work-hardened, resulting in additional material strength in areas important to that particular design.

In brief, those of skill in the art will appreciate that embodiments of the present invention offer a number of advantages over the prior art. These benefits include:

1. No machining (or minimal machining, depending on the design) is required, and chips can be reduced or eliminated. Holes may be pierced such that the resulting slugs of material are easily handled and recycled (compared to machining chips).
2. Less volume of material is needed to make a comparable part via casting.
3. Less labor is needed to produce a comparable part via casting.
4. Material does not need to be heated to form a part, saving energy costs.
5. Improved safety, particularly in lawnmowers and product where high-speed power is being transmitted, since a die cast material may break/shatter in a manner causing flying projectiles, as compared to a forged aluminum part where failure will tend to be limited to only deformation and not separation of pieces.
6. Tooling advantages of forge-forming processes over die cast processes:
    a. Tooling for a cold forged part can be approximately 6 times less cost than the tooling for die casting.
    b. Tooling for forge-forming can be more flexible and more adaptable to change as compared to die cast tooling.
    c. Cold forged tooling may last longer than die cast tooling.
7. Many material choices are increased, since 1100, 2000, 3000, 4000, 5000, 6000 and 7000 series aluminum alloys can be forged, while grades of material for die casting are more limited.
    a. Many forgeable alloys can be heat treated after forging to increase strength.
    b. A strength of forgeable aluminum increases the more the material is cold worked, which does not occur in die casting processes.
8. Cold forged parts do not have porosity (or tend to have substantially less porosity). Contrastingly, die cast parts often have some degree of porosity which can adversely affect durability and strength of the part, especially when the part is machined.
9. The surface finish over the life of forge-forming tooling is typically better than a tooling for a die cast part.

To further illustrate how various embodiments of the present invention achieve one or more of the benefits described above, provided below is a step-by-step example of a typical die cast housing manufacturing process followed by a step-by-step example of a forged housing manufacturing process of the present invention:

Exemplary Prior Art Die Cast Process
1. Melt aluminum—scrap created
2. Pour aluminum into die cast machine
3. Inject aluminum into die and cool/solidify aluminum
4. Remove part(s) from die
5. Break multiple parts apart (if applicable)
6. Remove flash by grinding/machining (flash gets re-melted)

7. Machine bearing bores (chip scrap from machining is created

8. Assemble

Forged Housing made by Present Inventive Process

1. Shear or cut aluminum bar
2. Extrude (cold forge) both ends on a press
3. Form "collar" (via cold forge) on a press
4. Pierce holes on a press—slugs easily recycled
5. Extrude bearing bores (cold forge) on a press
6. Assemble Thus, the present concept of a forged spindle housing design improves upon the known art of die cast spindle housings in several ways. This includes by eliminating or substantially reducing the need for secondary machining. Further, the disclosed design may eliminate or at least substantially reduce the production of waste chips during the secondary manufacturing/machining process. In particular, the disclosed design preferably generates pierced slugs (i.e., slugs pressed out of the material to form shapes, rather than shaping the object by machining). Slugs can be more easily recycled in comparison to waste chips from secondary machining of die cast parts. In one form, the entire spindle housing is made with tooling that creates holes, depressions, ribs, and/or notches via only pierced slugs, and without any machining in the manufactured part.

The present concept includes a forging process that uses flexible/adaptable tooling in the manufacturing process. As would be readily understood by those of skill in the art after reading this disclosure, many changes can be made to the forging tooling at minimal cost to make different/various versions of the housing. By contrast, changes to die cast tooling often require a significant amount of labor and cost. Similarly, the initial cost of die cast tooling (and changes to the tooling) can be much higher (such as up to six times the cost) as compared to the disclosed forging tooling.

The present cold-forge-forming processes described herein take advantage of and utilize work-hardened strength properties of forge-formed spindle housings to reduce or eliminate problems associated with part failures in known die cast parts. For example, typical die cast parts may, in certain failures, be prone to breaking apart. Pieces that do come apart may get projected out of the deck, which can be a safety hazard. By providing a forged aluminum housing, the material tends to deform rather than break apart, which is considerably safer. Also, additional material can be removed from the forge-formed spindle housings (due to the higher strength material), potentially allowing the parts to be made lighter in weight and/or smaller in size.

The foregoing description of various embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

The embodiments of the invention in which an exclusive property or privilege is claimed are defined as follows:

1. A method of forging a spindle housing for a lawn mower and simultaneously minimizing machining scrap, comprising steps of:
    separating an elongated rod blank from bar stock; forming a through hole in the rod blank that extends longitudinally through opposing ends of the rod blank including forging the rod blank to form at least a portion of the through hole and one of forging or pressing out a first slug to complete the through hole;
    forge-forming the rod blank to form a radially-extending collar on the rod blank between the opposing ends;
    forming attachment holes in the radially-extending collar by one of forging or pressing out a first slug to complete the attachment holes; and
    extruding bearing bores in each of the opposing ends to form the spindle housing.

2. The method defined in claim 1, wherein the step of forming the through hole includes first forming recesses in each of the opposing ends.

3. The method defined in claim 2, wherein the step of forming the through hole includes pressing a slug of material out from between the recesses to connect the recesses.

4. The method defined in claim 3, wherein the step of forming the attachment holes includes piercing slugs of material from the collar.

5. The method defined in claim 1, wherein the step of forming the attachment holes includes one of pressing or piercing slug-shaped pieces out of the collar.

6. The method defined in claim 5, wherein the step of forming the collar includes forming a circumferential flange that extends continuously 360 degree around a rod-shaped portion of the spindle housing.

7. The method defined in claim 5, wherein the step of forming the collar includes forming two or more arms by pressing slugs of material out of the collar, the arms being spaced circumferentially around a rod-shaped portion of the spindle housing.

8. The method defined in claim 1, wherein the step of forming attachment holes includes piercing slugs of material out of the collar.

9. The method defined in claim 8, wherein at least one of the steps of forming the through hole and forming the attachment holes includes forming ribs into the spindle housing.

10. The method defined in claim 1, wherein the step of forming the collar includes forming a circumferential flange that extends continuously 360 degree around a rod portion of the spindle housing.

11. The method defined in claim 1, wherein the step of forming the collar includes forming by one or more arms that define a discontinuous shape around a rod portion of the spindle housing.

12. The method defined in claim 1, including mounting at least one bearing to one of the opposing ends.

13. The method defined in claim 12, wherein the step of mounting the at least one bearing includes mounting two bearings, one in each of the opposing ends.

14. The method defined in claim 12, including mounting a shaft rotatably on the at least one bearing.

* * * * *